(12) United States Patent
Wakelam et al.

(10) Patent No.: US 10,814,430 B2
(45) Date of Patent: Oct. 27, 2020

(54) SYSTEMS AND METHODS FOR ADDITIVE MANUFACTURING FLOW CONTROL DEVICES

(71) Applicant: General Electric Company, Schenectady, NY (US)

(72) Inventors: Christian Wakelam, Munich (DE); Rene du Cauze de Nazelle, Munich (DE); Daniel Fischer, Höchstadt (DE); Hannes Haderlein, Bamberg (DE); Viktor Engel, Ahorn (DE); Florian Hoefler, Garching (DE); Rachel Wyn Levine, Bamberg (DE)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 15/948,648

(22) Filed: Apr. 9, 2018

(65) Prior Publication Data
US 2019/0308273 A1    Oct. 10, 2019

(51) Int. Cl.
  *B23K 26/342* (2014.01)
  *B22F 3/105* (2006.01)
  (Continued)

(52) U.S. Cl.
  CPC .......... *B23K 26/342* (2015.10); *B22F 3/1055* (2013.01); *B23K 26/08* (2013.01);
  (Continued)

(58) Field of Classification Search
  None
  See application file for complete search history.

(56) References Cited

U.S. PATENT DOCUMENTS

| 6,583,379 B1 * | 6/2003 | Meiners | B22F 3/1055 |
| | | | 219/121.6 |
| 8,895,893 B2 * | 11/2014 | Perret | B23K 26/127 |
| | | | 219/121.86 |

(Continued)

FOREIGN PATENT DOCUMENTS

| DE | 19853947 C1 | 2/2000 | |
| DE | 102010052206 A1 * | 5/2012 | .............. B33Y 40/00 |

(Continued)

OTHER PUBLICATIONS

Machine translation of DE 102010052206A1, Jan. 2020 (Year: 2020).*

(Continued)

*Primary Examiner* — Geoffrey S Evans
(74) *Attorney, Agent, or Firm* — Armstrong Teasdale LLP

(57) ABSTRACT

A flow control device for an additive manufacturing system is provided. The flow control device includes a gas supply configured to discharge a gas, a first flow modifier configured to modify at least one flow characteristic of a first portion of the gas, and a second flow modifier configured to cooperate with the first flow modifier to modify the at least on flow characteristic of the first portion of the gas. The second flow modifier is further configured to modify at least one flow characteristic of a second portion of the gas, and the first flow modifier and the second flow modifier are configured to cooperate to direct at least a portion of the first portion and the second portion of the gas towards a melt pool in a plurality of particles.

16 Claims, 6 Drawing Sheets

(51) Int. Cl.
| | |
|---|---|
| *B33Y 30/00* | (2015.01) |
| *B23K 26/08* | (2014.01) |
| *B23K 26/70* | (2014.01) |
| *B23K 26/142* | (2014.01) |
| *B23K 26/14* | (2014.01) |
| *B23K 26/144* | (2014.01) |
| *B23K 26/12* | (2014.01) |
| *B29C 64/35* | (2017.01) |
| *B33Y 40/00* | (2020.01) |
| *B33Y 10/00* | (2015.01) |
| *B29C 64/371* | (2017.01) |

(52) U.S. Cl.
CPC .......... *B23K 26/123* (2013.01); *B23K 26/128* (2013.01); *B23K 26/142* (2015.10); *B23K 26/144* (2015.10); *B23K 26/1437* (2015.10); *B23K 26/1438* (2015.10); *B23K 26/70* (2015.10); *B29C 64/35* (2017.08); *B33Y 10/00* (2014.12); *B33Y 30/00* (2014.12); *B33Y 40/00* (2014.12); *B22F 2003/1056* (2013.01); *B29C 64/371* (2017.08)

(56) References Cited

U.S. PATENT DOCUMENTS

| | | |
|---|---|---|
| 9,776,362 B2 | 10/2017 | Chuang et al. |
| 9,879,795 B2 | 1/2018 | Burkhart et al. |
| 2016/0001401 A1 | 1/2016 | Dimter et al. |
| 2016/0136731 A1 | 5/2016 | McMurtry et al. |
| 2016/0318072 A1* | 11/2016 | Martin .................. B33Y 40/00 |
| 2017/0120330 A1* | 5/2017 | Sutcliffe ............... B22F 3/1055 |
| 2017/0146382 A1 | 5/2017 | Gold et al. |
| 2017/0173880 A1 | 6/2017 | Desimone et al. |
| 2017/0182598 A1 | 6/2017 | Crear et al. |
| 2017/0203511 A1 | 7/2017 | Burkhart et al. |
| 2017/0259278 A1* | 9/2017 | Tanaka .................... B05B 1/14 |
| 2017/0266887 A1 | 9/2017 | Roviaro et al. |
| 2018/0333779 A1* | 11/2018 | Sutcliffe ............... B22F 3/1055 |

FOREIGN PATENT DOCUMENTS

| | | | |
|---|---|---|---|
| DE | 102010052206 A1 | 5/2012 | |
| DE | 102013214925 A1 * | 2/2015 | .......... B23K 26/142 |
| DE | 102013214925 A1 | 2/2015 | |
| EP | 2956262 A2 | 12/2015 | |
| EP | 3154730 A1 | 4/2017 | |
| EP | 3170593 A1 | 5/2017 | |
| WO | 9208592 A1 | 5/1992 | |
| WO | 2007112808 A1 | 10/2007 | |
| WO | 2016079494 A2 | 5/2016 | |
| WO | 2017013454 A2 | 1/2017 | |
| WO | 2017156623 A1 | 9/2017 | |
| WO | 2017201051 A1 | 11/2017 | |

OTHER PUBLICATIONS

Zekovic et al., "Numerical Simulation and Experimental Investigation of Gas—Powder Flow from Radially Symmetrica in Laser-Based Direct Metal Deposition", International Journal of Machine Tools and Manufacture, vol. 47, Issue: 01, pp. 112-123, Jan. 2007.

* cited by examiner

SYSTEMS AND METHODS FOR ADDITIVE MANUFACTURING FLOW CONTROL DEVICES

BACKGROUND

The subject matter described herein relates generally to additive manufacturing systems and, more particularly, to additive manufacturing systems including flow control apparatuses.

At least some additive manufacturing systems involve the consolidation of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and LaserCusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) In at least some DMLM systems, a melt pool is formed in the particulate by the focused energy source and the particulate is consolidated to form a build layer of the component on the build platform at an atmospheric pressure. However, in at least some known systems, soot and other small particulate matter are created during the consolidation process and may become suspended in a gas surrounding the build platform and between the build layer and the focused energy source, reducing the effective power of the energy source being used for consolidation, which may result in consolidation inconsistencies including dimensional, surface finish, and particle-to-particle consolidation inconsistencies in the completed component.

BRIEF DESCRIPTION

In one aspect, a flow control device for an additive manufacturing system is provided. The additive manufacturing system defines a first direction, a second direction, and a third direction. The flow control device includes a gas supply configured to discharge a gas, a first flow modifier configured to modify at least one flow characteristic of a first portion of the gas, and a second flow modifier configured to cooperate with the first flow modifier to modify the at least one flow characteristic of the first portion of the gas. The second flow modifier is further configured to modify at least one flow characteristic of a second portion of the gas, and the first flow modifier and the second flow modifier are configured to cooperate to direct at least a portion of the first portion and the second portion of the gas towards a melt pool in a plurality of particles.

In another aspect, an additive manufacturing system is provided. The additive manufacturing system defines a first direction, a second direction, and a third direction. The additive manufacturing system includes a consolidation device configured to generate a melt pool in a build layer and an enclosure. The enclosure includes the build layer including a plurality of particles, a gas supply configured to discharge a gas, a first flow modifier configured to modify at least one flow characteristic of a first portion of the gas, and a second flow modifier configured to cooperate with the first flow modifier to modify the at least one flow characteristic of the gas. The second flow modifier is further configured to modify at least one flow characteristic of a second portion of the gas, and the first flow modifier and the second flow modifier are configured to cooperate to direct at least a portion of the first portion and the second portion of the gas towards a melt pool in a plurality of particles.

In yet another aspect, a method of fabricating a component using an additive manufacturing system is provided. The method includes discharging a gas into an enclosure from a gas supply. The method also includes operating a consolidation device to direct an energy beam to be incident on a build layer within the enclosure to form a melt pool in the build layer. The method further includes modifying at least one flow characteristic of a first portion of the gas using a first flow modifier in cooperation with a second flow modifier. Finally, the method includes modifying at least one flow characteristic of a second portion of the gas using the second flow modifier such that the first flow modifier and the second flow modifier are in cooperation to direct at least a portion of the first portion and the second portion of the gas towards the melt pool.

DRAWINGS

These and other features, aspects, and advantages of the present disclosure will become better understood when the following detailed description is read with reference to the accompanying drawings in which like characters represent like parts throughout the drawings, wherein.

Figure 1:
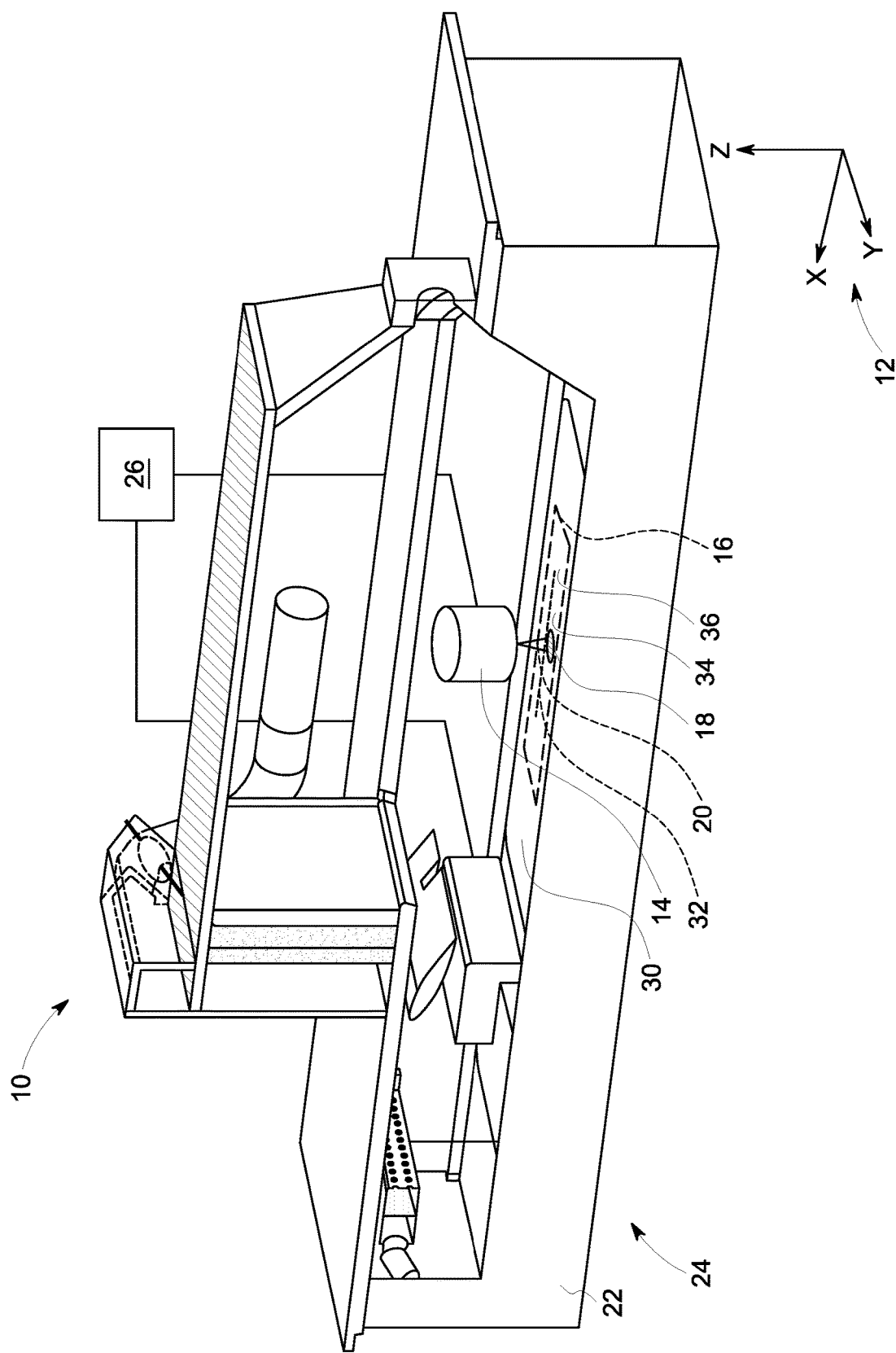
FIG. 1 is a schematic partial cutaway view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein include a flow control device for an additive manufacturing system. The additive manufacturing system defines a first direction, a second direction, and a third direction, the three directions are orthogonal to each other. The flow control device includes a gas supply configured to discharge a gas, a first flow modifier, and a second flow modifier. The first flow modifier is configured to modify at least one flow characteristic of a first portion of the gas. The second flow modifier is configured to cooperate with the first flow modifier to modify the at least one flow characteristic of the first portion of the gas, and is further configured to modify at least one flow characteristic of a second portion of the gas. The first flow modifier and the second flow modifier are configured to cooperate to direct at least a portion of the first portion and the second portion of the gas towards a melt pool in the build layer. The flow control device facilitates reducing the cost to additively manufacture components and improving the quality of the additively manufactured components by reducing the amount of particulates between a build layer of the component and the consolidation device, thereby reducing the amount of power required to consolidate the component and reducing consolidation inconsistencies due to particulate matter interference with the consolidation device and the component being consolidated.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 10. A coordinate system 12 includes an X-axis defining a first, longitudinal direction, a Y-axis defining a second, horizontal direction, and a Z-axis defining a third, vertical direction. In the exemplary embodiment, additive manufacturing system 10 includes a consolidation device 14 and a flow control device 24 for fabricating a component 16 using a layer-by-layer manufacturing process. Alternatively, additive manufacturing system 10 may include any component that facilitates consolidation of a material using any of the processes and systems described herein. In the exemplary embodiment, consolidation device 14 is a laser device 14 configured to provide a high-intensity heat source configured to generate a melt pool 18 (not shown to scale) in a powdered material using an energy beam 20. Specifically, consolidation device 14 is a yttrium-based solid state laser device configured to emit a laser beam 20 having a wavelength of about 1070 nanometers (nm). In alternative embodiments, consolidation device 14 may include any type of energy source that facilitates operation of additive manufacturing system 10 as described herein. Consolidation device 14 and flow control device 24 are contained within a system enclosure 22. In alternative embodiments, consolidation device 14 may be positioned outside of system enclosure 22. Additive manufacturing system 10 also includes a computer control system, or controller 26.

Consolidation device 14 is moved by an actuator or an actuator system (not shown) that is configured to move consolidation device 14 in the first direction, the second direction, and the third direction to facilitate fabricating a layer of component 16 within additive manufacturing system 10. For example, and without limitation, consolidation device 14 is pivoted about a central point, moved in a linear path, a curved path, and/or rotated to cover a portion of the powder on a build platform 30 to facilitate directing energy beam 20 along a scan path 32 along the surface of a plurality of particles 34 of a build layer 36 to form a layer of component 16 within system enclosure 22. Alternatively, system enclosure 22 and consolidation device 14 are moved in any orientation and manner that enables additive manufacturing system 10 to function as described herein.

In the exemplary embodiment, additive manufacturing system 10 is operated to fabricate component 16 from a computer modeled representation of the 3D geometry of component 16. The computer modeled representation may be produced in a computer aided design (CAD) or similar file. The CAD file of component 16 is converted into a layer-by-layer format that includes a plurality of build parameters for each layer of component 16, for example, build layer 36 of component 16 including plurality of particles 34 to be consolidated by additive manufacturing system 10. In the exemplary embodiment, component 16 is modeled in a desired orientation relative to the origin of the coordinate system used in additive manufacturing system 10. The geometry of component 16 is sliced into a stack of layers of a desired thickness, such that the geometry of each layer is an outline of the cross-section through component 16 at that particular layer location. Scan paths 32 are generated across the geometry of a respective layer. The build parameters are applied along scan path 32 to fabricate that layer of component 16 from particles 34 used to construct component 16. The steps are repeated for each respective layer of component 16 geometry. Once the process is completed, an electronic computer build file (or files) is generated, including all of the layers. The build file is loaded into controller 26 of additive manufacturing system 10 to control the system during fabrication of each layer.

After the build file is loaded into controller 26, additive manufacturing system 10 is operated to generate component 16 by implementing the layer-by-layer manufacturing process, such as a direct metal laser melting method. The exemplary layer-by-layer additive manufacturing process does not use a pre-existing article as the precursor to the final component, rather the process produces component 16 from a raw material in a configurable form, such as particles 34. For example, and without limitation, a steel component can be additively manufactured using a steel powder. Additive manufacturing system 10 enables fabrication of components, such as component 16, using a broad range of materials, for example, and without limitation, metals, ceramics, glass, and polymers.

Figure 2:
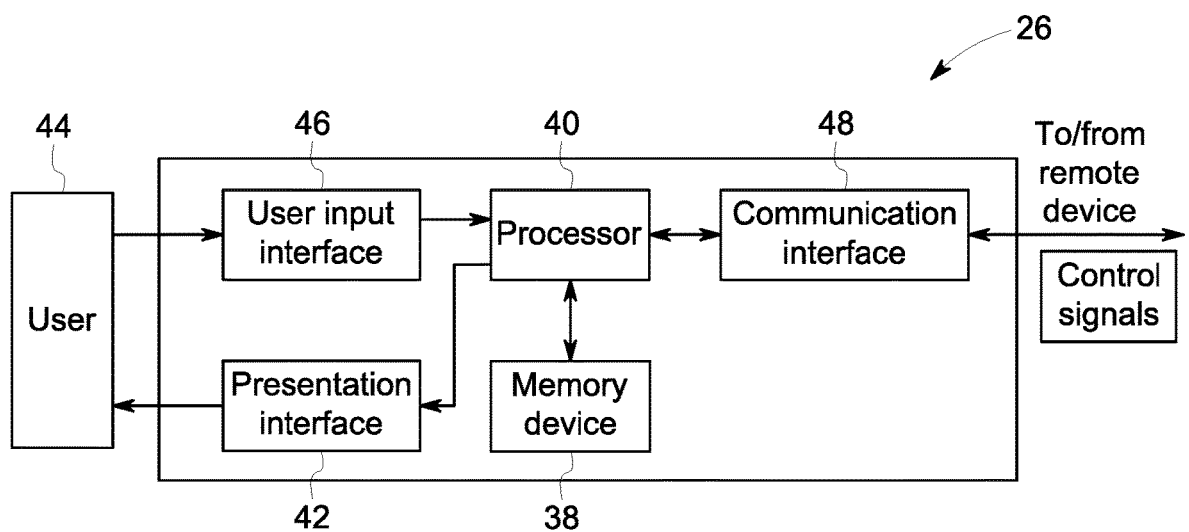
FIG. 2 is a block diagram of a controller that may be used to operate the additive manufacturing system shown in FIG. 1.

FIG. 2 is a block diagram of controller 26 that may be used to operate additive manufacturing system 10 (shown in FIG. 1). In the exemplary embodiment, controller 26 is any type of controller typically provided by a manufacturer of additive manufacturing system 10 to control operation of additive manufacturing system 10. Controller 26 executes operations to control the operation of additive manufacturing system 10 based at least partially on instructions from human operators. Controller 26 includes, for example, a 3D model of component 16 to be fabricated by additive manufacturing system 10. Operations executed by controller 26 include controlling power output of consolidation device 14 (shown in FIG. 1), adjusting a mounting system (not shown) to control the movement of consolidation device 14 and the scanning velocity of energy beam 20, and adjusting and controlling the movement of flow control device 24. In alternative embodiments, controller 26 may execute any operation that enables additive manufacturing system 10 to function as described herein.

In the exemplary embodiment, controller 26 includes a memory device 38 and a processor 40 coupled to memory device 38. Processor 40 may include one or more processing units, such as, without limitation, a multi-core configuration. Processor 40 is any type of processor that permits controller 26 to operate as described herein. In some embodiments, executable instructions are stored in memory device 38. Controller 26 is configurable to perform one or more operations described herein by programming processor 40. For example, processor 40 may be programmed by encoding an operation as one or more executable instructions and providing the executable instructions in memory device 38. In the exemplary embodiment, memory device 38 is one or more devices that enable storage and retrieval of information such as executable instructions or other data. Memory device 38 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 38 may be configured to store any type of data, including, without limitation, build parameters associated with component 16. In some embodiments, processor 40 removes or "purges" data from memory device 38 based on the age of the data. For example, processor 40 may overwrite previously recorded and stored data associated with a subsequent time or event. In addition, or alternatively, processor 40 may remove data that exceeds a predetermined time interval. In addition, memory device 38 includes, without limitation, sufficient data, algorithms, and commands to facilitate monitoring of build parameters and the geometric conditions of component 16 being fabricated by additive manufacturing system 10.

In some embodiments, controller 26 includes a presentation interface 42 coupled to processor 40. Presentation interface 42 presents information, such as the operating conditions of additive manufacturing system 10, to a user 44. In one embodiment, presentation interface 42 includes a display adapter (not shown) coupled to a display device (not shown), such as a cathode ray tube (CRT), a liquid crystal display (LCD), an organic LED (OLED) display, or an "electronic ink" display. In some embodiments, presentation interface 42 includes one or more display devices. In addition, or alternatively, presentation interface 42 includes an audio output device (not shown), for example, without limitation, an audio adapter or a speaker (not shown).

In some embodiments, controller 26 includes a user input interface 46. In the exemplary embodiment, user input interface 46 is coupled to processor 40 and receives input from user 44. User input interface 46 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 42 and user input interface 46.

In the exemplary embodiment, a communication interface 48 is coupled to processor 40 and is configured to be coupled in communication with one or more other devices, such as consolidation device 14, and to perform input and output operations with respect to such devices while performing as an input channel. For example, communication interface 48 may include, without limitation, a wired network adapter, a wireless network adapter, a mobile telecommunications adapter, a serial communication adapter, or a parallel communication adapter. Communication interface 48 may receive a data signal from or transmit a data signal to one or more remote devices.

Presentation interface 42 and communication interface 48 are both capable of providing information suitable for use with the methods described herein, such as, providing information to user 44 or processor 40. Accordingly, presentation interface 42 and communication interface 48 may be referred to as output devices. Similarly, user input interface 46 and communication interface 48 are capable of receiving information suitable for use with the methods described herein and may be referred to as input devices.

Figure 3:
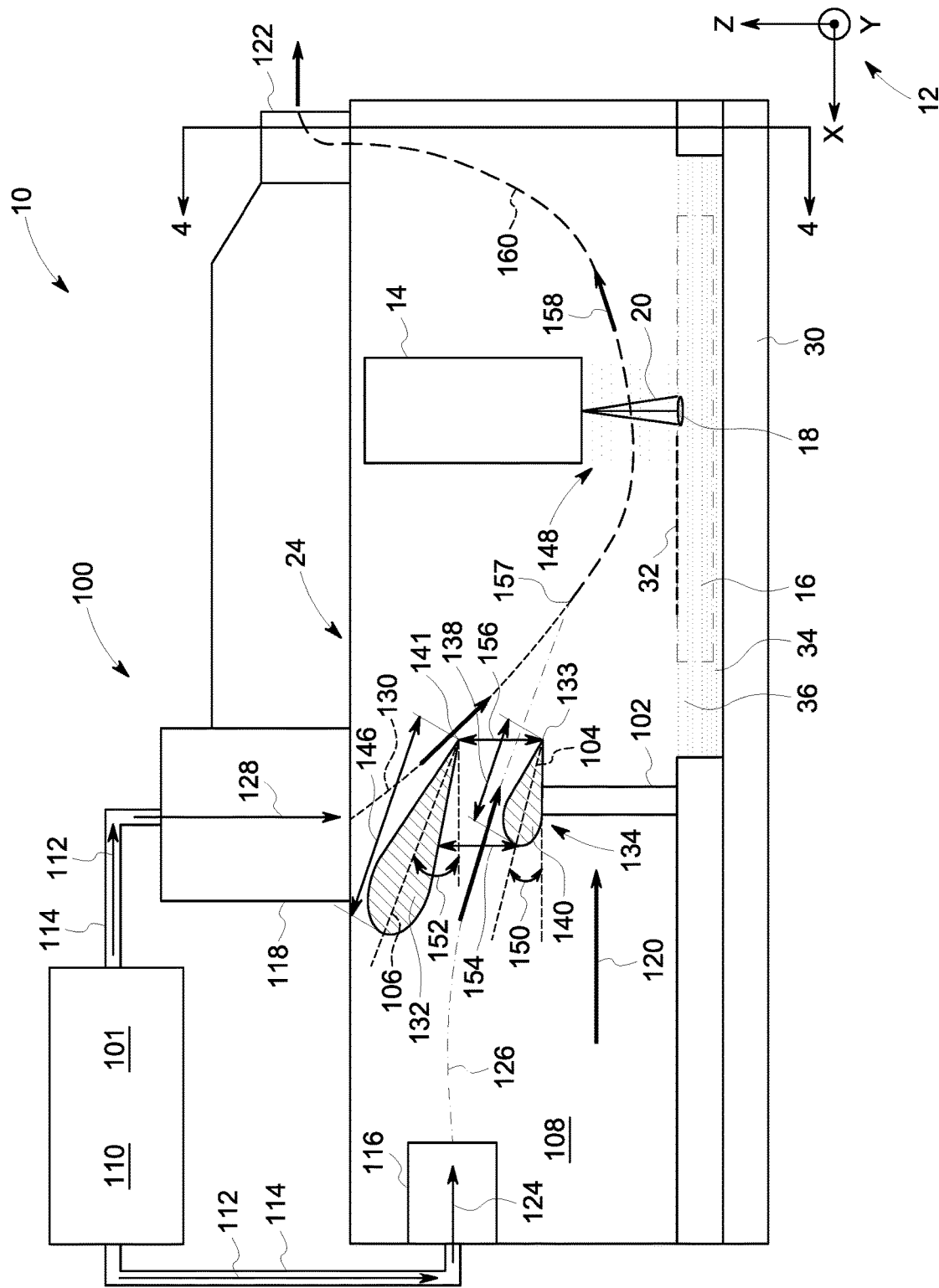
FIG. 3 is a schematic side view of the additive manufacturing system shown in FIG. 1 illustrating an exemplary flow control device.
Figure 4:
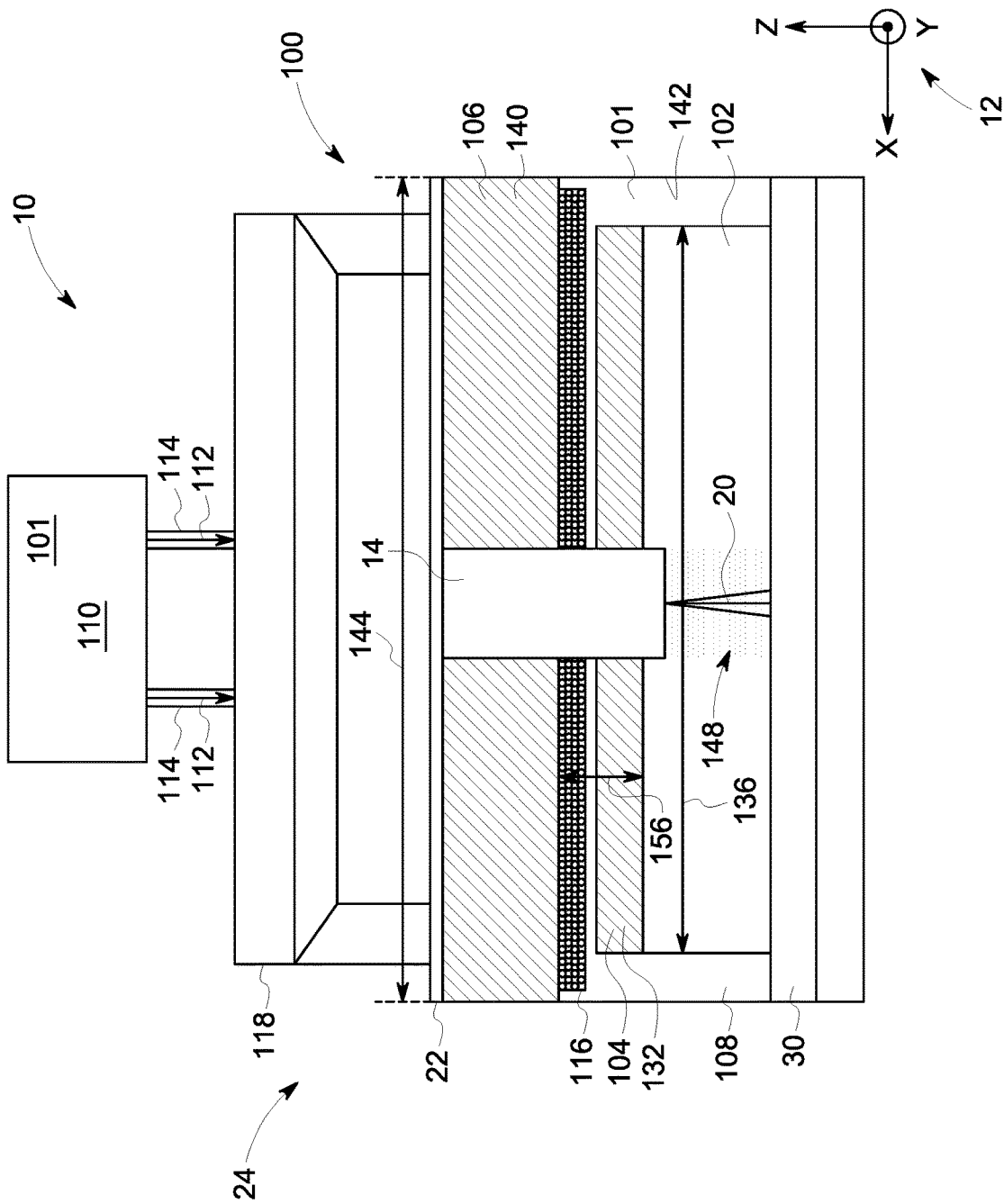
FIG. 4 is a section view of the pressurized consolidation assembly shown in FIG. 3 taken about section line 4-4.

FIG. 3 is a schematic side view of additive manufacturing system 10 (shown in FIG. 1) illustrating exemplary flow control device 24. FIG. 4 is a section view of additive manufacturing system 10 (shown in FIG. 3) taken about section line 4-4. In the exemplary embodiment, flow control device 24 includes a gas supply 100 configured to discharge a flow of a gas 101 into system enclosure 22, a recoater 102 including a first flow modifier 104, and a second flow modifier 106. In the exemplary embodiment, system enclosure 22 includes a first volume 108 of gas 101 coupled in flow communication to a second volume 110 of gas 101 via gas supply 100. More particularly, gas 101 flows along a flow direction 112 through gas pipes 114 from second volume 110 to gas supply 100, where it is discharged into first volume 108 within system enclosure 22 through one of a first gas discharge 116 and a second gas discharge 118 and moves along a downstream direction 120 to an exit from system enclosure 22 through a discharge port 122.

In the exemplary embodiment, first gas discharge 116 is configured to discharge a first portion 124 of gas 101 into system enclosure 22 at a first speed along the first direction, substantially parallel to build layer 36, defining a first flow path 126. Second gas discharge 118 is configured to discharge a second portion 128 of gas 101 into system enclosure 22 at a second speed along the third direction, substantially perpendicular to build layer 36, defining a second flow path 130. In an alternative embodiment one of first gas discharge 116 and second gas discharge 118 may be coupled in flow communication with a third volume containing a gas that is different from gas 101 in second volume 110. In the exemplary embodiment, second gas discharge 118 is a primary gas supply and first gas discharge 116 is a secondary gas supply, wherein second gas discharge 118 is configured to supply a greater amount of gas 101 to first volume 108 within system enclosure 22 than first gas discharge 116 is configured to supply to system enclosure 22.

In the exemplary embodiment, gas 101 is a shielding gas, and, more particularly, gas 101 is argon. In alternative embodiments, gas 101 may be at least one of carbon dioxide, helium, oxygen, nitrogen, nitric oxide, sulfur hexafluoride, and dichlorodifluoromethane. In the exemplary embodiment, a pressure of gas 101 within first volume 108 of system enclosure 22 is approximately fourteen and a half pounds per square inch (psi) (atmospheric conditions). In the exemplary embodiment, a pressure of gas 101 within second volume 110 is higher than that the pressure of gas 101 within first volume 108, facilitating gas 101 from first volume 108 moving into and through system enclosure 22. In alternative embodiments, the pressures of gas 101 within first volume 108 and second volume 110 may be any pressures that facilitate operation of additive manufacturing system 10 as described herein.

In the exemplary embodiment, recoater 102 is configured to move along the first direction and to distribute a plurality of particles 34 across build layer 36 within additive manufacturing system 10. Recoater 102 includes a first flow modifier 104 configured to modify at least one flow characteristic of first portion 124 of gas 101. In the exemplary embodiment, first flow modifier 104 is a first flow feature 132 coupled to a vertically upper portion 134 of recoater 102 and extending along the second direction by a first flow feature width 136 and having a first flow feature length 138. In the exemplary embodiment, first flow feature 132 is an airfoil shape. In alternative embodiments, first flow feature 132 is at least one of a spherical shape, a ramp shape, a nozzle shape, and a hyperbolic shape. In further alternative embodiments, first flow modifier 104 may include any component in any arrangement that facilitates operation of flow control device 24 as described herein.

In the exemplary embodiment, second flow modifier 106 is configured to cooperate with first flow modifier 104 to modify the at least one flow characteristic of first portion 124 of gas 101 and to modify at least one flow characteristic of second portion 128 of gas 101. In the exemplary embodiment, second flow manipulator includes a second flow feature 140. Second flow feature 140 is an airfoil shape positioned vertically above first flow feature 132 and extending between inner walls 142 of system enclosure 22 along the second direction by a second flow feature width 144 and having a second flow feature length 146 such that a second trailing edge 141 of second flow feature 140 is substantially aligned with a first trailing edge 133 of first flow feature 132, relative to the first direction. In alternative embodiments, second flow feature 140 is at least one of a spherical shape, a ramp shape, a nozzle shape, and a hyperbolic shape. In further alternative embodiments, second flow modifier 106 may include any component in any arrangement that facilitates operation of flow control device 24 as described herein.

In the exemplary embodiment, during the consolidation process of build layer 36, melt pool 18 is formed by energy beam 20 causing a plasma plume to form between melt pool 18 and consolidation device 14 and an amount of spatter and soot to be formed, ejected radially outward from melt pool 18, and at least partially suspended as a debris cloud 148 in the gaseous environment surrounding build layer 36. Exposing melt pool 18 and consolidation device 14 to a flow of gas 101, specifically gas 101 having a gas velocity, relative to consolidation device 14, sufficient to carry the suspended particles within debris cloud 148 from between consolidation device 14 and melt pool 18, facilitates reducing power requirements of consolidation device 14, improving dimensional precision of component 16, and reducing particulate build up within system enclosure 22.

In the exemplary embodiment, first portion 124 of gas 101 moves along first flow path 126 and contacts a leading edge and a vertically upper surface of first flow feature 132 and a leading edge and vertically lower surface of second flow feature 140. In the exemplary embodiment, first flow feature 132 is positioned at a first angle 150 relative to the first direction and second flow feature 140 is positioned at a second angle 152 relative the first direction, wherein first flow feature 132 and second flow feature 140 are positioned and oriented to act as a flow modifier, for either accelerating, damping, or otherwise altering flow with respect to first portion 124 of gas 101. More specifically, an entrance distance 154 defined between upstream portions of first flow feature 132 and second flow feature 140 is greater than an exit distance 156 defined between downstream portions of first flow feature 132 and second flow feature 140 such that first portion 124 of gas 101 is accelerated while passing between first flow feature 132 and second flow feature 140. Additionally, in the exemplary embodiment, first flow feature 132 and second flow feature 140 are positioned to change a direction of first flow path 126, as shown in FIG. 3, to facilitate directing first portion 124 towards debris cloud 148 and merging with second portion 128 of gas 101.

In the exemplary embodiment, second portion 128 of gas 101 is discharged from second gas discharge 118, moves along second flow path 130, and contacts a vertically upper surface of second flow feature 140. Second portion 128 of gas 101 is channeled along the upper surface of second flow feature 140, and second angle 152 of second flow feature 140 facilitates changing a direction of second flow path 130 to facilitate directing second portion 128 towards debris cloud 148 and to facilitate second portion 128 merging with first portion 124. In alternative embodiments, second portion 128 of gas 101 may be discharged from any portion of additive manufacturing system 10 in along any direction that facilitates operation of additive manufacturing system 10 as described herein.

In the exemplary embodiment, first portion 124 mixes and combines with second portion 128 at a confluence 157, downstream of first flow feature 132 and second flow feature 140, forming a third portion 158 and defining a third flow path 160. Third portion 158 represents a combination of first portion 124 and second portion 128, and the directionality of third flow path 160 is a result of a combination of vectors from first portion 124 and second portion 128. More specifically, third flow path 160 results from the combination of a volume of first portion 124 at a first velocity and a volume of second portion 128 at a second velocity, wherein the volume and a speed of second portion 128 is greater than the volume and a speed of first portion 124 such that third flow path 160 defines a flow path predetermined to facilitate third portion 158 interacting with debris cloud 148.

In the exemplary embodiment, third portion 158 of gas 101 moves along third flow path 160 and interacts with debris cloud 148 such that particulate matter within debris cloud 148 that is being generated by the consolidation process is continuously substantially evacuated from between consolidation device 14 and melt pool 18 by gas 101. In the exemplary embodiment, consolidation device 14 is illustrated as being positioned within system enclosure 22. In alternative embodiments, gas 101 of third portion 158 containing an amount of particulate matter continues along third flow path 160 to discharge port 122. In the exemplary embodiment, discharge port 122 is configured to facilitate discharging third portion 158 from system enclosure 22 to a cleaning system (not shown) configured to remove the particulate matter from gas 101 for future re-use. In an alternative embodiment, discharge port 122 is configured to facilitate discharging third portion 158 from system enclosure 22 in any manner that facilitates operation of additive manufacturing system 10 as described herein.

Figure 5:
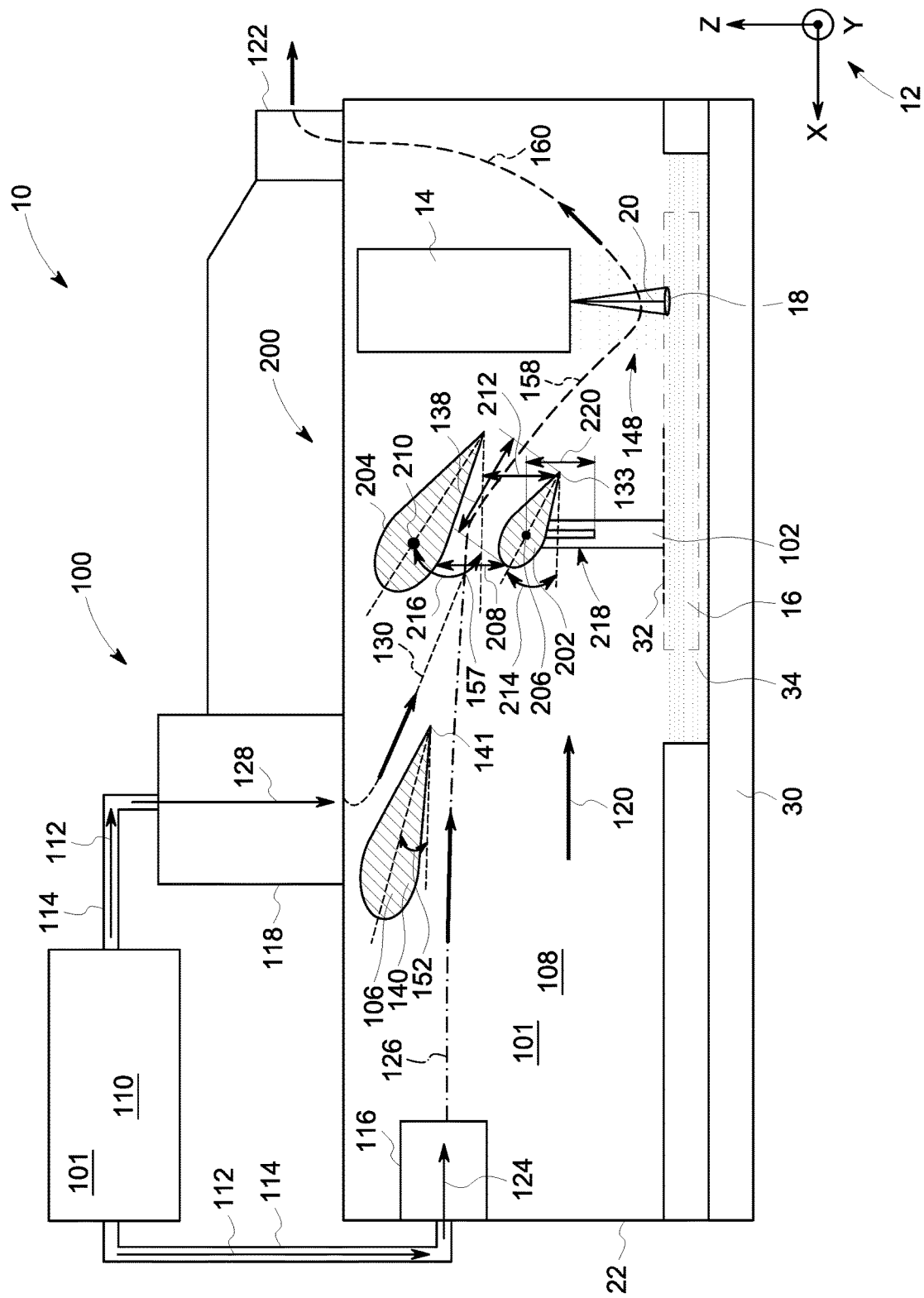
FIG. 5 is a schematic side view of an alternative embodiment of the additive manufacturing system shown in FIG. 3 illustrating an exemplary movable flow control device.

FIG. 5 is a schematic side view of an alternative embodiment of additive manufacturing system 10 (shown in FIGS. 3-4) illustrating exemplary flow control device 24 including a movable flow modifier system 200. The embodiment shown in FIGS. 3 and 4 is substantially similar to the embodiment shown in FIG. 5, except for the presence of movable flow modifier system 200 including a movable first flow feature 202 and a movable second flow feature 204. In the exemplary embodiment, second flow modifier 106 is an airfoil shaped second flow feature 140 and movable first flow feature 202 and movable second flow feature 204 are airfoil shaped. In alternative embodiments, movable first flow feature 202 and movable second flow feature 204 may be any of a spherical shape, a ramp shape, a nozzle shape, and a hyperbolic shape. In further alternative embodiments, movable flow modifier system 200 may include any components in any arrangement that facilitates operation of additive manufacturing system 10 as described herein.

In the exemplary embodiment, movable first flow feature 202 and movable second flow feature 204 are configured to rotate about axes substantially aligned with the second direction and movable first flow feature 202 is configured to translate along the third direction. More specifically, movable first flow feature 202 is configured to rotate about a first shaft 206 extending along the second direction between inner walls 142 and movable second flow feature 204 is configured to rotate about a second shaft 210 extending along the second direction between inner walls 142. In the exemplary embodiment, movable first flow feature 202 is positioned at movable first angle 214 with respect to the first direction and movable second flow feature 204 is positioned at a movable second angle 216 with respect to the first direction. In alternative embodiments, movable first flow feature 202 and movable second flow feature 204 may be configured and positioned in any manner that facilitates operation of additive manufacturing system 10 as described herein.

In the exemplary embodiment, a movable feature entrance distance 208 is defined between upstream portions of movable first flow feature 202 and movable second flow feature 204, and a movable feature exit distance 212 is defined between downstream portions of movable first flow feature 202 and movable second flow feature 204. Additionally, movable first flow feature 202 is configured to be positionable along the third direction within a slot 218 by a slot distance 220 to further facilitate placement of movable first flow feature 202. Movable first flow feature 202 and movable second flow feature 204 are configured to cooperate with second flow feature 140 to modify at least one flow characteristic of first portion 124 and second portion 128 of gas 101 to facilitate merging first portion 124 and second portion 128 into third portion 158 of gas 101 and to facilitate directing third portion 158 of gas 101 towards debris cloud 148. In alternative embodiments, movable first flow feature 202, movable second flow feature 204, and second flow feature 140 may be positioned to cooperate in any manner that facilitates operation of additive manufacturing system 10 as described herein.

Figure 6:
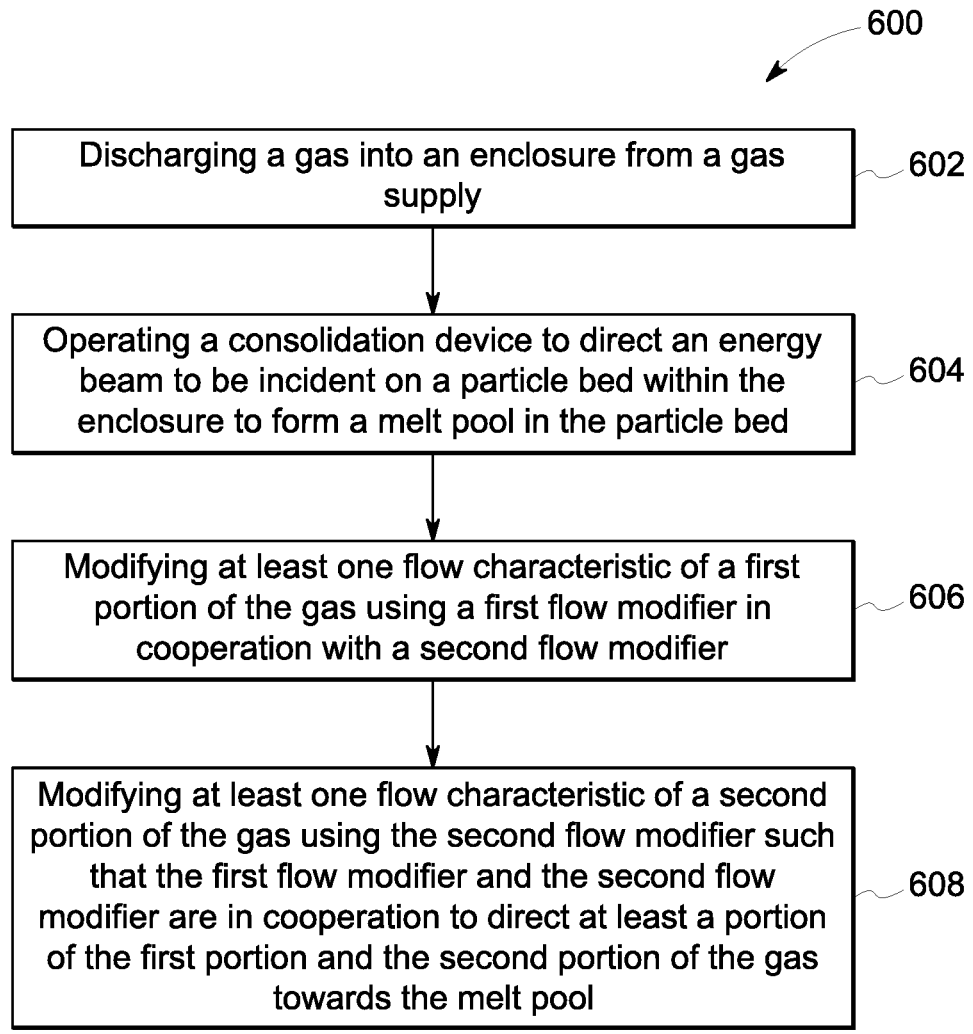
FIG. 6 is a flowchart illustrating an exemplary method that may be used to fabricate a component using the additive manufacturing system shown in FIG. 1.

FIG. 6 is a flow chart illustrating a method 600 for fabricating a component 16 using additive manufacturing system 10 (shown in FIG. 1). Referring to FIG. 105, method 600 includes discharging 602 a gas 101 into a system enclosure 22 from a gas supply 100. Method 600 also includes operating 604 a consolidation device 14 to direct an energy beam 20 to be incident on a build layer 36 within system enclosure 22 to form a melt pool 18 in build layer 36. Method 600 further includes modifying 606 at least one flow characteristic of a first portion 124 of gas 101 using a first flow modifier 104 in cooperation with a second flow modifier 106. Finally, method 600 includes modifying 608 at least one flow characteristic of a second portion 128 of gas 101 using second flow modifier 106 such that first flow modifier 104 and second flow modifier 106 are in cooperation to direct at least a portion of first portion 124 and second portion 128 of gas 101 towards melt pool 18.

The embodiments described herein include a flow control device for an additive manufacturing system. The additive manufacturing system defines a first direction, a second direction, and a third direction, the three directions orthogonal to each other. The flow control device includes a gas supply configured to discharge a gas, a first flow modifier, and a second flow modifier. The first flow modifier is configured to modify at least one flow characteristic of a first portion of the gas. The second flow modifier is configured to cooperate with the first flow modifier to modify the at least one flow characteristic of the first portion of the gas, and is further configured to modify at least one flow characteristic of a second portion of the gas. The first flow modifier and the second flow modifier are configured to cooperate to direct at least a portion of the first portion and the second portion of the gas towards a melt pool in the build layer. The flow control device facilitates reducing the cost to additively manufacture components and improving the quality of the additively manufactured components by reducing the amount of particulates between a build layer of the component and the consolidation device, thereby reducing the amount of power loss required to consolidate the component and reducing consolidation inconsistencies due to particulate matter interference between the consolidation device and the component being consolidated.

An exemplary technical effect of the methods, systems, and apparatus described herein includes at least one of: a) improving consistency of consolidation of a component during the additive manufacturing process, b) reducing a power required to consolidate a component during the additive manufacturing process, c) improving component dimensional and surface finish consistency, and d) reducing the cost of additively manufacturing a component.

Exemplary embodiments of flow control devices including gas supplies and flow modifiers are described above in detail. The flow control devices, and methods of using and manufacturing components with such devices are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control device for an additive manufacturing system, the additive manufacturing system defining a first direction, a second direction orthogonal to the first direction, and a third direction orthogonal to the first and second directions, said flow control device comprising:
   a gas supply comprising a first gas supply and a second gas supply, wherein said first gas supply is configured to discharge a first portion of a gas along the first direction, and wherein said second gas supply is configured to discharge a second portion of the gas along the third direction;
   a first flow modifier configured to modify at least one flow characteristic of the first portion of the gas; and
   a second flow modifier configured to cooperate with the first flow modifier to modify the at least one flow characteristic of the first portion of the gas, wherein said second flow modifier is further configured to modify at least one flow characteristic of the second portion of the gas, and wherein said first flow modifier and said second flow modifier are configured to cooperate to direct at least a portion of the first portion and the second portion of the gas towards a melt pool in a build layer.

2. The flow control device in accordance with claim 1, wherein said first flow modifier is coupled to a recoater configured to move along the first direction and to distribute a plurality of particles across the build layer.

3. The flow control device in accordance with claim 1, wherein said first flow modifier comprises a first flow feature extending along the second direction, and wherein said second flow modifier comprises at least one second flow feature extending along the second direction.

4. The flow control device in accordance with claim 3, wherein at least one of said first flow feature and said second flow feature is configured to rotate about an axis substantially aligned with the second direction.

5. The flow control device in accordance with claim 3, wherein each of said first flow feature and said second flow feature is at least one of an airfoil shape, a spherical shape, a ramp shape, a nozzle shape, and a hyperbolic shape.

6. The flow control device in accordance with claim 3, wherein said first flow feature and said second flow feature are positioned such that the first portion of the gas is accelerated while passing between said first flow feature and said second flow feature.

7. An additive manufacturing system defining a first direction, a second direction orthogonal to the first direction, and a third direction orthogonal to the first and second directions, said additive manufacturing system comprising:
an enclosure comprising:
a build layer comprising a plurality of particles;
a gas supply configured to discharge a gas;
a first flow modifier comprising a first flow feature extending along the second direction and configured to modify at least one flow characteristic of a first portion of the gas; and
a second flow modifier comprising at least one second flow feature extending along the second direction and configured to cooperate with the first flow modifier to modify the at least one flow characteristic of the first portion of the gas, wherein said second flow modifier is further configured to modify at least one flow characteristic of a second portion of the gas, wherein at least one of said first flow feature and said second flow feature is configured to rotate about an axis substantially aligned with the second direction; and
a consolidation device configured to generate a melt pool in the build layer, wherein said first flow modifier and said second flow modifier are configured to cooperate to direct at least a portion of the first portion and the second portion of the gas towards the melt pool in the build layer.

8. The additive manufacturing system in accordance with claim 7, wherein said first flow modifier is coupled to a recoater configured to move along the first direction and to distribute a plurality of particles across the build layer.

9. The additive manufacturing system in accordance with claim 7, wherein said gas supply comprises a first gas supply and a second gas supply, wherein said first gas supply is configured to discharge the first portion of the gas along the first direction, and wherein said second gas supply is configured to discharge the second portion of the gas along the third direction.

10. The additive manufacturing system in accordance with claim 7, wherein each of said first flow feature and said second flow feature is at least one of an airfoil shape, a spherical shape, a ramp shape, a nozzle shape, and a hyperbolic shape.

11. The additive manufacturing system in accordance with claim 7, wherein said first flow feature and said second flow feature are positioned such that the first portion of the gas is accelerated while passing between said first flow feature and said second flow feature.

12. A method of fabricating a component using an additive manufacturing system, the additive manufacturing system defining a first direction, a second direction orthogonal to the first direction, and a third direction orthogonal to the first and second directions, said method including:
discharging a first portion of the gas from a first gas supply along the first direction and discharging a second portion of the gas from a second gas supply along the third direction;
operating a consolidation device to direct an energy beam to form a melt pool in a build layer within the enclosure;
modifying at least one flow characteristic of a first portion of the gas using a first flow modifier in cooperation with a second flow modifier; and
modifying at least one flow characteristic of a second portion of the gas using the second flow modifier, wherein the first flow modifier and the second flow modifier are configured to cooperate to direct at least a portion of the first portion and the second portion of the gas towards the melt pool.

13. The method in accordance with claim 12, wherein modifying at least one flow characteristic of the first portion of the gas wherein modifying at least one flow characteristic of the first portion of the gas comprises using a first flow modifier coupled to a recoater configured to move along the first direction and to distribute a plurality of particles across the build layer.

14. The method in accordance with claim 12, wherein modifying at least one flow characteristic of the first portion of the gas wherein modifying at least one flow characteristic of the first portion of the gas comprises using a first flow feature extending along the second direction and comprising at least one of an airfoil shape, a spherical shape, a ramp shape, a nozzle shape, and a hyperbolic shape.

15. The method in accordance with claim 12, wherein modifying at least one flow characteristic of the second portion of the gas wherein modifying at least one flow characteristic of the first portion of the gas comprises using a second flow feature extending along the second direction and comprising at least one of an airfoil shape, a spherical shape, a ramp shape, a nozzle shape, and a hyperbolic shape.

16. The method in accordance with claim 12, modifying at least one flow characteristic of the first portion of the gas wherein modifying at least one flow characteristic of the first portion of the gas comprises positioning the first flow modifier and the second flow modifier such that the first portion of the gas is accelerated while passing between the first flow modifier and the second flow modifier.

* * * * *